United States Patent [19]

Scharf

[11] Patent Number: 4,921,469
[45] Date of Patent: May 1, 1990

[54] DISTRIBUTING DEVICE FOR CHAFF CHOPPERS

[75] Inventor: Alois Scharf, Melle, Fed. Rep. of Germany

[73] Assignee: BISO Bitter, GmbH & Co., Rodinghausen-Bruchmuhlen, Fed. Rep. of Germany

[21] Appl. No.: 271,869

[22] Filed: Nov. 16, 1988

[30] Foreign Application Priority Data

Nov. 17, 1987 [DE] Fed. Rep. of Germany ....... 3739067

[51] Int. Cl.$^5$ ............................................. A01F 12/44
[52] U.S. Cl. ..................................... 460/10; 460/903
[58] Field of Search ........ 130/27 E, DIG. 5, DIG. 6; 198/640, 641; 460/10, 111, 903

[56] References Cited

U.S. PATENT DOCUMENTS 2,581,198  1/1952  McPhail ............................ 130/27 E
3,563,476  2/1971  Donelson, Jr. ................. 198/640 X Primary Examiner—William P. Neuder
Attorney, Agent, or Firm—Morgan & Finnegan

[57] ABSTRACT

A distributing device for chaff choppers for attachment to mowing-threshing machines has a top cover plate, beneath which right and left groups of baffles are arranged next to one another, preferably at right angles to the cover plate. The baffles are pivotably supported around axles at their ends facing the chopper and spaced therefrom, while being rigidly connected by guide bolts penetrating guide slots in the cover plate or in the machine casing. A set bar is associated with each group of baffles. The baffles are connected with each other by the guide bolts which are rotatable in fixed bearings and by two guide rails, and, at their ends facing the chopper, rotatably and displaceably arranged in points on the cover plate. The guide slots of each group extend displaced relative to each other in a transverse direction, substantially parallel to each other and to a line through the axles. The set bars are outwardly inclined to that line and spacing of the guide bolts from the axles decreases from baffle to baffle in correspondence with outward displacement of the guide slots. A set leave is connected jointedly to each set bar, and is articulated in a point spaced from its point of articulation on the set bar on the cover plate. A coupling rod connects the set levers. Thus, the groups of baffles can be adjusted to different extents. The set levers are displaceably connected with the coupling rod and displaceable lengthwise to extents limited by stops.

17 Claims, 10 Drawing Sheets

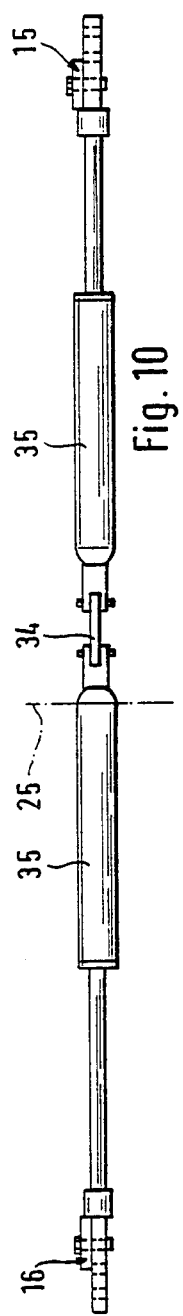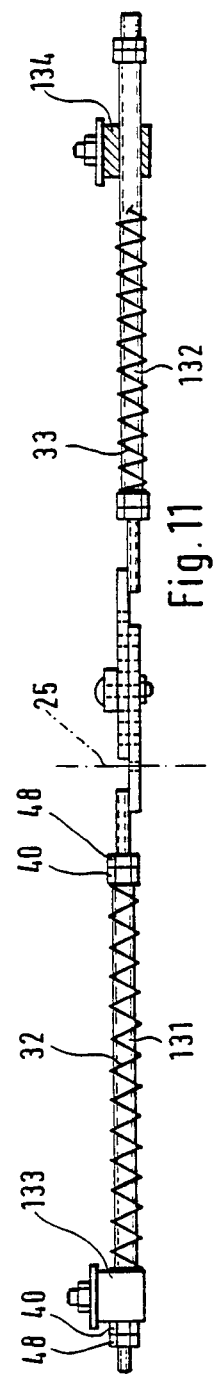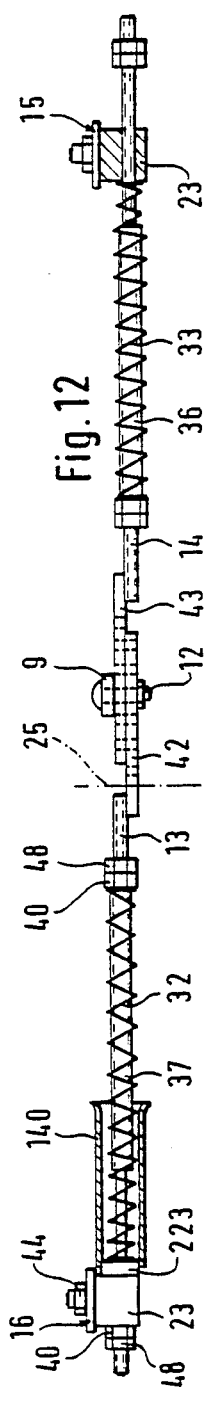

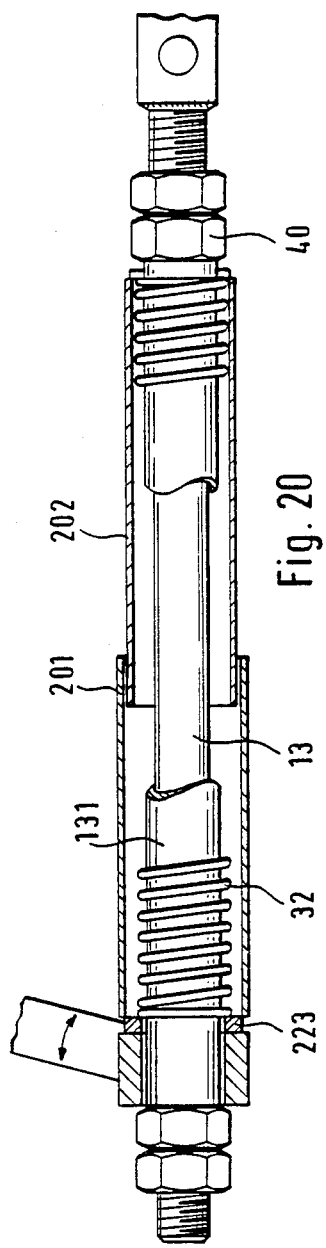
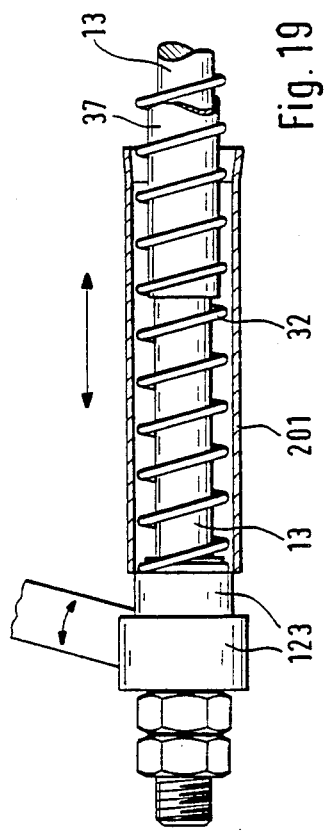

DISTRIBUTING DEVICE FOR CHAFF CHOPPERS

The invention relates to a distributing device for chaff choppers, preferably chaff choppers attached to and for mowing-and-threshing machines (harvesters), with a top cover plate, beneath which a right and a left group of baffles are arranged next to one another to an angle, preferably at a right angle relative to the plate, the baffles being supported for swinging around axles at their ends facing the chopper and, spaced from the axles, rigidly connected with guide bolts penetrating guide slots on the cover plate, or on the casing; and with a set bar associated with each of the groups of baffles, whereby the guide bolts are connected with the baffles by fixed bearings and the baffles, at their ends facing the chopper, are supported in oblong holes on the axles; the guide slots of each group are displaced in the transverse direction and extend substantially parallel with one another and with a line drawn through the axles; whereby the set bars of each group are arranged with an outward inclination relative to the line in a way such that the spacing of the guide bolts from the axles is reduced from one baffle to the next in correspondence with the outward displacement of the guide slots; whereby a set lever is connected jointedly with each set bar, such set lever being articulated on the cover plate and spaced from its point of articulation on the set bar; and whereby a coupling rod connects the set levers with each other.

Such a distributor device is known from German Patent DE-PS 35 30 195. This known distributor device is, in terms of engineering, structured in a simple way, and permits reducing the angle between adjacent baffles when swinging the latter from the outside inwardly, or permitting such angle to become negative when the baffles, in the course of their inward swinging movement, are swung from their acutely angled diverging positions via their parallel positions into acutely angled converging positions. Starting from a swung-out parallel position of the baffles, it is possible also to have the latter increasingly converge against each other as they swing inwardly. The known set device permits reversing the distributing device from broad spreading of chopped straw to depositing of the latter in the form of a heap extending lengthwise, and vice versa.

In the known distributing device, the baffles are adjusted by a set bar, on which the guide bolts of the baffles are supported and swinging, whereby different swinging angles of the baffles at the same amount of displacement travel of the set bar are accomplished in that the swinging radii of the baffles diminish inwardly. As the guide bolts of the baffles are displaced in straight-line, parallel guide slots of the cover plate, the oblong holes permit the lengthwise displacement of the baffles, as required as they are swinging.

The distributing device is actuated by swinging the set levers that are connected jointedly with each set bar. The two set levers are connected with each other by a coupling rod. Thus a movement of the coupling rod causes the two groups of baffles to be swung in the same sense.

With the known distributing device, cross wind conditions or slopes can be taken into account by actuating the coupling rod accordingly. The latter is actuated in such a way that the baffles point in the direction facing the wind, or uphill.

It has been found that in practical use that a more flexible adjustment to special crosswind conditions or slopes may be desirable under special circumstances. In particular, it may be desirable to swing one group of baffles to a lesser extent than the other. With the known distributor device this is possible only with separate drives. For example, in the known distributor device, provision may be made to actuate the two groups of baffles independently of each other, using a separate drive for each group. This, however, is costly in terms of equipment expenditure, as two drives are required.

Now, based on the above considerations the objective of the present invention is to create a distributing device of the above-specified type in which the two groups of baffles can be adjusted in a simple way to different extents.

According to the invention, this objective is accomplished in that the set levers are connected with the coupling rod with lengthwise displaceability being limited by stops. The point of connection between the set levers and the coupling rod thus can shift between an outer stop and an inner stop. If, for example, the coupling rod is shifted to the left, the set lever associated with the right group of baffles is carried along by the outer stop, whereas the set lever belonging to the left group of baffles is driven along by the associated inner stop. The conditions are reversed if the coupling rod is shifted to the right. As a result, in particular, if the spreading width is great, the group of baffles moving outwardly is adjusting outwardly to a lesser extent than the group of baffles moving inwardly. With the distributing device of the invention it is, thus, possible to adjust the two groups of baffles in a simple way to different extents. This can be accomplished in a simple manner because only one drive is required for the coupling rod, but not two independently operating drives for both set levers and, therefore, both groups of baffles.

If the outer stops and/or inner stops are adjustable, the distributing device can be adapted to different requirements in even better ways.

The inner stops may be formed in a simple way by the ends of the tubes surrounding the coupling rod.

Between the points of connection between the set levers and the coupling rod and between the inner stops on the coupling rod, provision may be made for pressure springs for equalizing the motion of these points of connection.

According to a beneficial additional feature, the inner stops are formed by pressure springs supported in blocks. Thus the pressure springs serve both as movement equalizers and inner stops.

According to a further advantageous feature, the coupling rod is comprised of two piston-cylinder units, preferably gas springs. This embodiment, too, leads to equalizing of the motion. The inner stops are formed by the piston-cylinder units.

The length of the coupling rod may be adjustable so as to make provision for an additional beneficial adjustment possibility.

The bearings of the guide bolts are slidably guided on the set bars in oblong holes and fixable in the latter. In this way, desired angular positions of the baffles can be adjusted.

The oblong holes are usefully arranged on the set bars and displaced relative to each other in the transverse direction, extending substantially parallel with a line drawn through the axles around which the baffles are swinging.

For fixing the set bar in the position desired for the baffles, a guide bolt may be adapted for tightening in the oblong hole of the cover plate by means of a nut preferably fitted with a manual lever.

Preferably, force-transmitting pieces are connected jointedly with the set levers and displaceably guided on the coupling rod. A first protective sleeve gripping over the coupling rod may be fastened on each of the force-transmitting pieces and, if necessary, across springs arranged on the coupling rod.

A second protective sleeve gripping under the first protective sleeve in a telescope-like way is preferably fastened on each of the stops, whereby the protective sleeves are dimensionally adapted to each other in such a way that the spring is always covered by the two protective sleeves.

It is advantageous to provide a preferably flexible plate extending across the width of the distributing device, the same being fastened on the latter to protect the parts disposed under the plate.

According to another feature of the invention, provision is made so that each of the two lateral limiting plates of the hood-like cover plate is connected jointedly with a baffle-like flap on the discharge or outlet side, such flap being connected jointedly with the set bar or set lever by a two-part coupling rod, whereby the two parts of the latter are displaceable against each other to a limited extent in a telescope-like way and, in their expanded position, acted upon by a spring; and so that the baffle-like flap is forced with each outward adjustment into its outwardly swung position, and with each inward adjustment carried along inwardly over the last portion of the path of travel of the set lever until the coupling rod is completely extended. In this way, the lateral flaps adapt to the given position of the baffles.

An embodiment of the invention is explained in greater detail in the following description thereof which is to be taken with reference to the accompanying Drawings, in which:

FIG. 10 shows a coupling rod with two gas pressure springs;

FIG. 11 shows a coupling rod with two spiral springs and two tubes;

FIG. 12 shows a coupling rod with two spiral springs and two tubes partly surrounding the coupling rod;

FIG. 19 shows an enlarged view of a force-transmitting piece with a protective sleeve;

FIG. 20 is a representation corresponding with FIG. 19 with two protective sleeves engaging each other in a telescope-like way.

Figure 1:
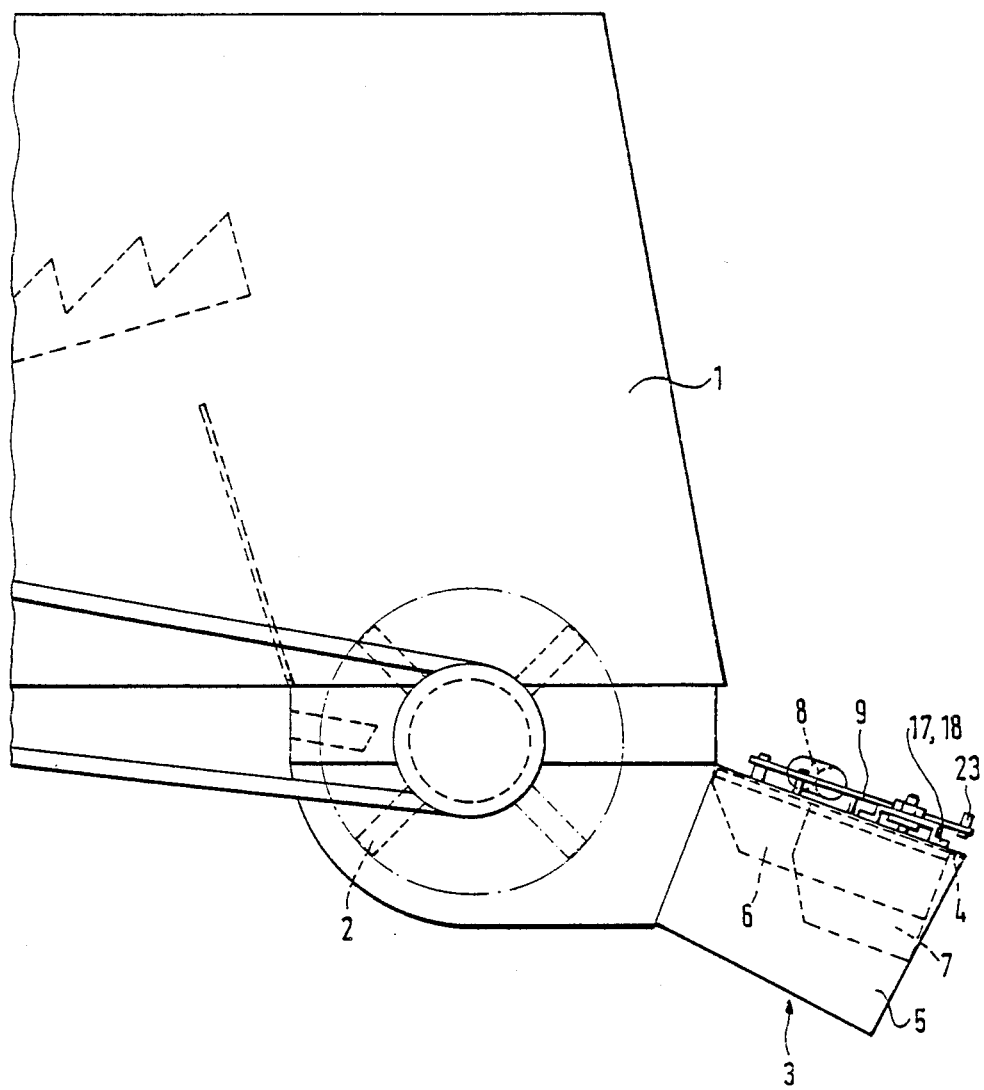
FIG. 1 shows a schematic view of the rear part of a mowing-and-threshing machine with an attached chopper fitted with a distribution device for chopped straw.

FIG. 1 shows a chaff chopper 2 attached in the customary way to a mower-thresher 1, said chopper having on its outlet or discharge side a distributing device 3 for the chopped straw. The distributing device 3 is comprised of a cover plate 4, which, in the way of a hood, is fitted with laterally angled legs 5. The swinging baffles 6 and the swinging lateral flaps 7 are accommodated under the cover plate 4.

Figure 2:
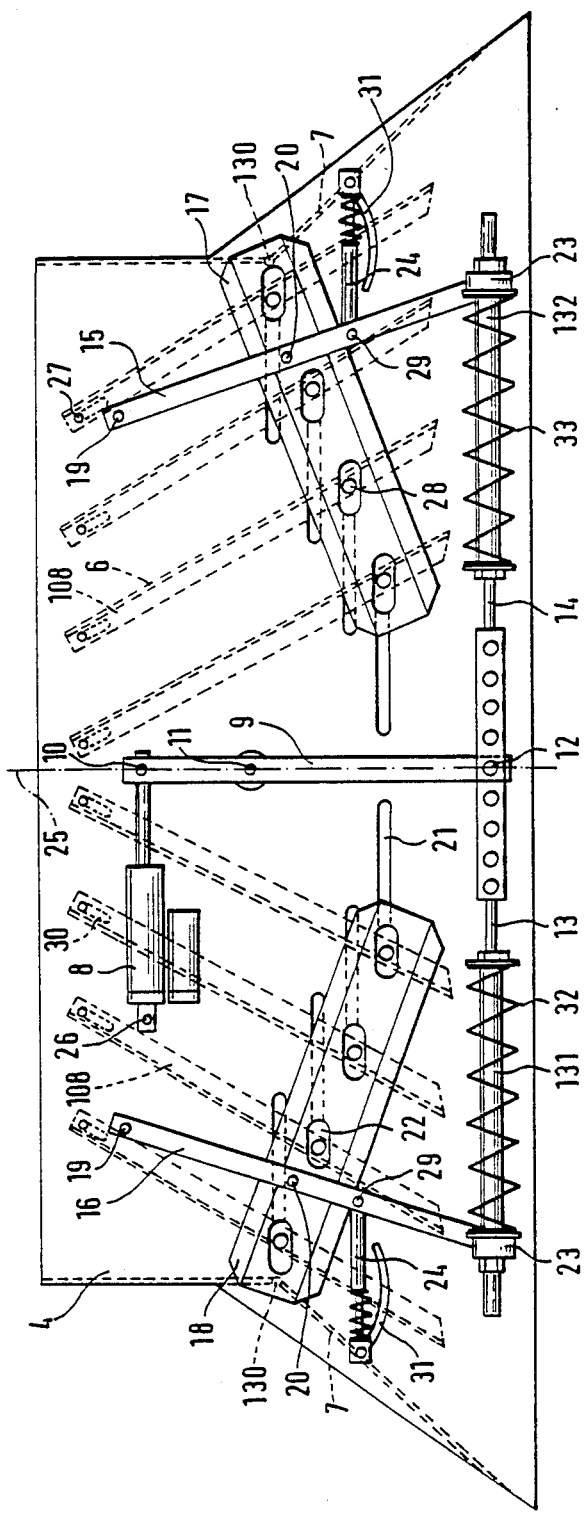
FIG. 2 is a top view of the distributing device with baffles in the swung position and the coupling rod in the center position.
Figure 3:
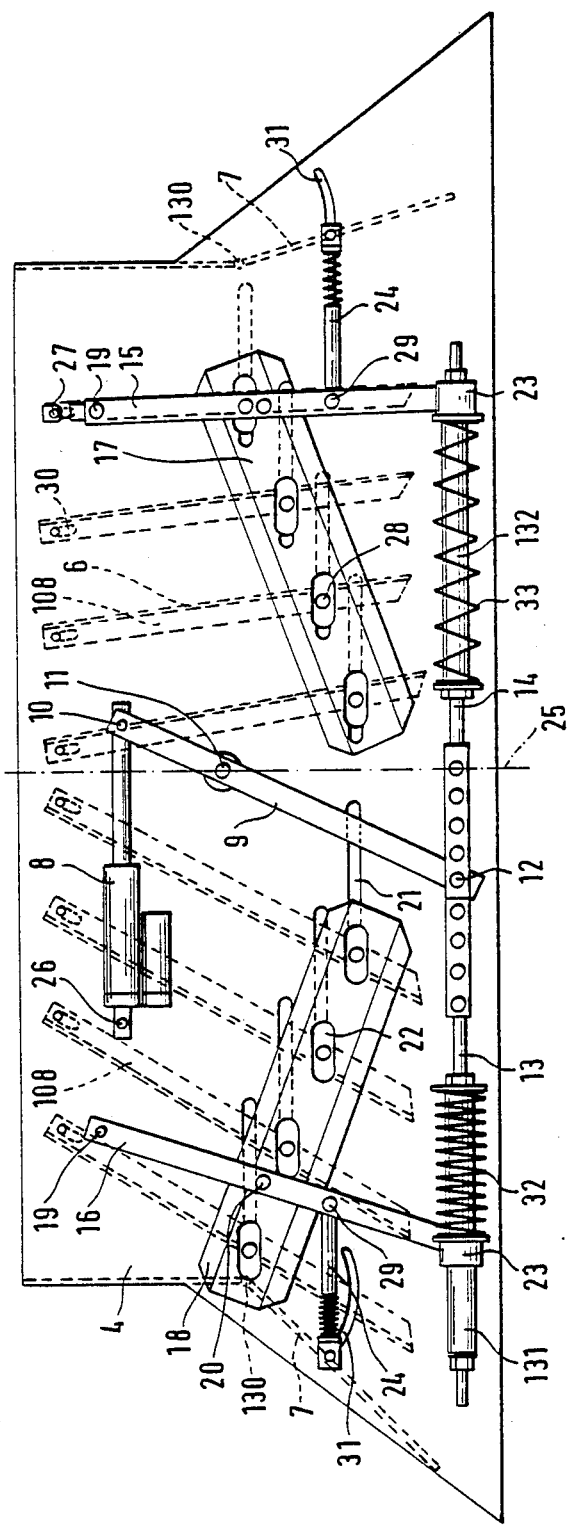
FIG. 3 shows the distributing device shown in FIG. 2 with the coupling rod fully shifted to the left.

FIGS. 2 and 3 show that the baffles 6 are arranged at angles, preferably at right angles relative to the cover plate 4, and may additionally have different curvatures around transverse axes. Provision is made for the angled legs 108 for holding the baffles 6. At their ends facing the chopper 2, the legs 108 of the baffles 6 have the oblong holes 30, with which they are pivotably supported on the axles 27, the latter being fastened on the cover plate 4. The legs 108 have, spaced from the oblong holes 30 the guide bolts 28 disposed on the back side of said legs and penetrating or extending through the guide slots 21 of the cover plate 4. The guide slots 21, as shown in FIGS. 2 and 3, are staggered and arranged parallel with each other in a way such that they extend approximately parallel with the line extending through the axles 27, and that they have approximately equal spacing between each other in the transverse direction right and left. Due to the staggered arrangement of the guide slots 21, their radial spacing from the associated axles 27 decreases from the inside outwardly.

Figure 17:
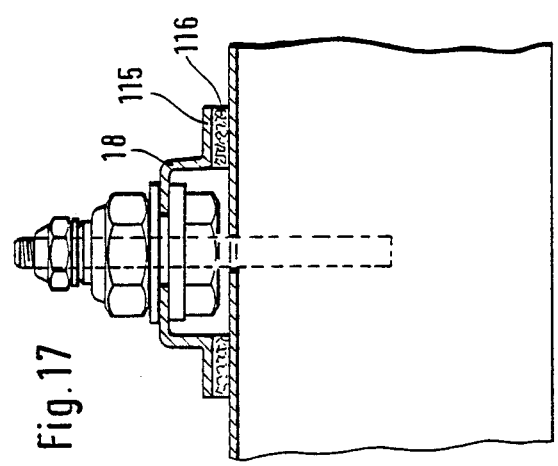
FIG. 17 is a sectional view with a cut through the distributing device along line A-B in FIG. 15.
Figure 15:
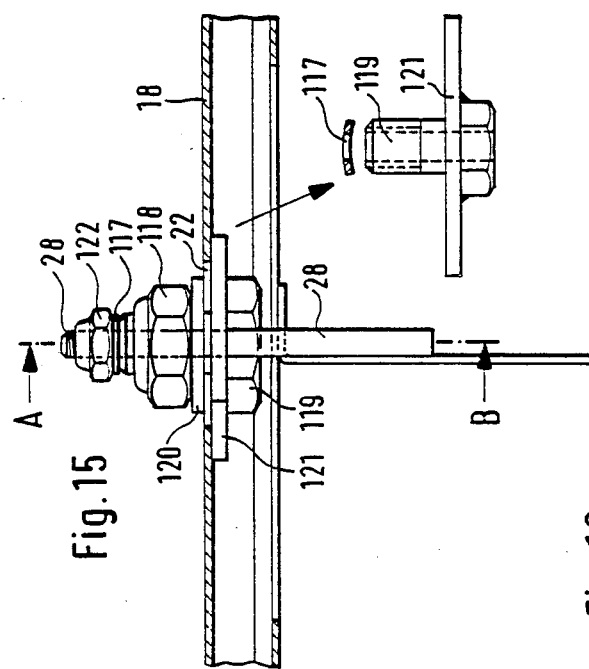
FIG. 15 is a partial sectional view of the distributing device within the zone or area of a set bar.
Figure 16:
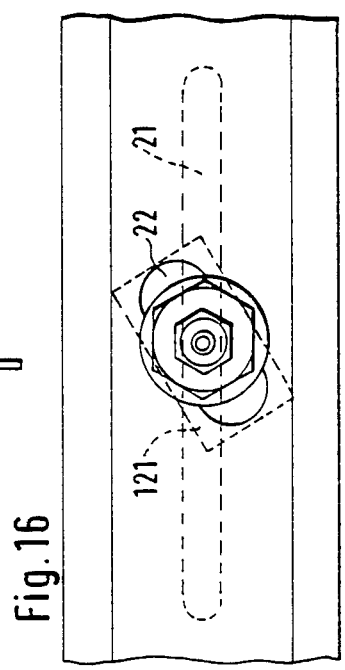
FIG. 16 is a top view of the cut area according to FIG. 15.

The free ends of the guide bolts 28 additionally extend through the oblong holes 22 of the set bars 17, 18. The latter have, as is shown best in FIG. 17, a substantially U-shaped cross section, whereby the legs are additionally angled outwardly in order to form the flange-shaped support surfaces 115. In order to prevent grooves from forming on the cover plate, the support surfaces 115 are fitted with the strips 116 made from felt or the like. The guide bolts 28 are—as is shown best in FIG. 15—supported swinging in the bushings 119 which, via the nuts 118 and the disks 120 and elements 121, are secured by screwing in the oblong holes 22 of the set bars 17, 18. The guide bolts can be tightened via the nuts 122 as well. Therefore, at least one nut 122 is usefully fitted with a manual lever, so that after each adjustment the set position can be fixed.

A two-arm set lever 15, 16 is, in its center area, pivotably connected with each set bar 17, 18 through the swing axle 20. The arms of swing lever 15, 16 on the chopper side are connected with the cover plate 4 for swinging around the axles 19.

The outwardly pointing arms of the set levers 15, 16 are connected jointedly with the force-transmitting pieces 23 and 123, respectively. The coupling rods 13, 14, are comprised of a left push-pull rod 14. Both push-pull rods have, in their inner zones, a row of holes, and the two rods are connected with each other by the bolt 12. The two rows of holes permit changing the total length of the coupling rod 13, 14. The bolt 12 is connected with the rearward end of the swing lever 9, the latter being pivotably supported for swinging around the rotary point 11. The front end of the swing lever 9 for the transmission of force supports a bolt 10, which is connected jointedly with the rod of a spindle motor 8, or with the piston rod of a hydraulic cylinder 8. The spindle 8 or hydraulic cylinder 8 is pivotably supported for rotating around the swivel point 26.

A left pressure spring 32 and a right pressure spring 33 are disposed on the coupling rod 13, 14. The left pressure spring 32 is supported on the outside on the left force-transmitting piece 23, and on the inside on another stop means. The right pressure spring 33 is supported on the outside on the right force-transmitting piece 23, and on the inside on another stop means.

Figure 18:
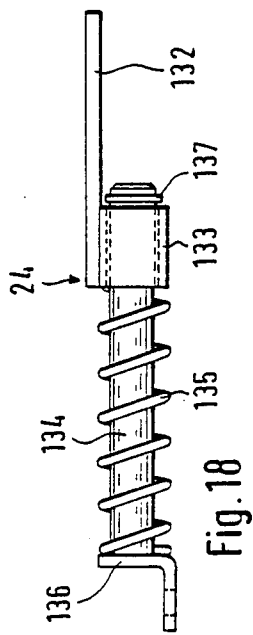
FIG. 18 is a lateral view of part of the coupling rod serving for the adjustment of the baffle-like flap.

The baffle-type flaps 7 are pivotably supported for swinging around the vertical axles 130 within the discharge or outlet zone of the lateral legs 5 of the hood-like cover plate 4. Via the actuating bars 24, said flaps are connected jointedly with the set levers 15, 16. Each actuating bar 24 consists of two parts, as shown in FIG. 18, and has a first part 132 connected jointedly with the two-part actuating bar 24, the part 132 having a bushing 133 in which the second, rod-shaped part 134 of the actuating bar 24 is guided for axial displacement. A pressure spring 135 is pushed over the bar 134 and supported on the one side on the bushing 133, and on the other side on the bearing element 136. The bar 134 is secured against dropping from the bushing by a safety ring 137.

Due to the fact that the bar-like part 134 is guided in the bushing 133 of the first part 132 in a way similar to a telescope, and the pressure spring 135 tends to keep the two-part actuating bar 24 in its stretched condition, the set lever 15, which is swung inwardly in FIG. 3, carries the flap 7 along inwardly as it travels through the last part of its path of swing, whereas the outwardly swung set lever 16 keeps the flap 7 in its outwardly swung position.

The set bolt of the baffle-type flap 7, which bolt is provided with a joint, is guided in a circularly curved oblong hole 31 of the cover plate 4.

Figure 4:
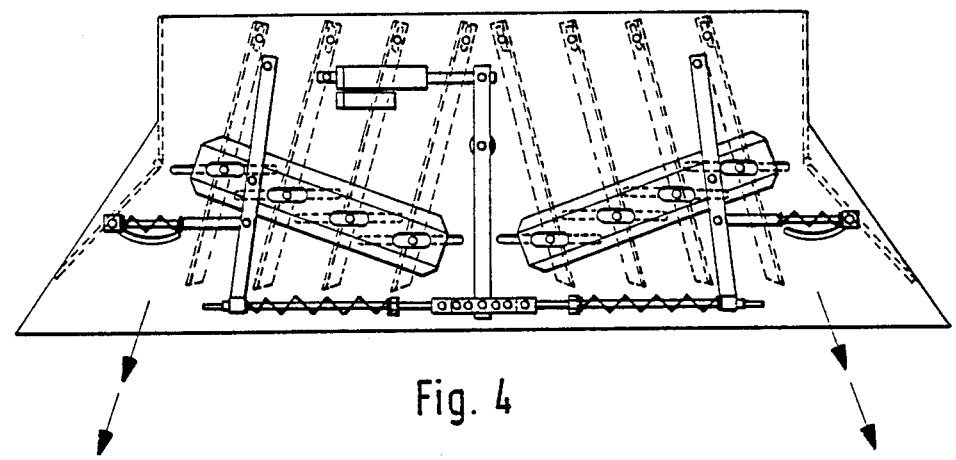
FIG. 4 is a top view of the distributing device with baffles swung approximately into their center position, in a chopping operation on a plane field with no wind.

FIGS. 2 and 4 show the distributing device in its center position, thus in the symmetrical position relative to the center line 25. This position is selected when the chopper is operated in a plane field with no wind action.

Figure 5:
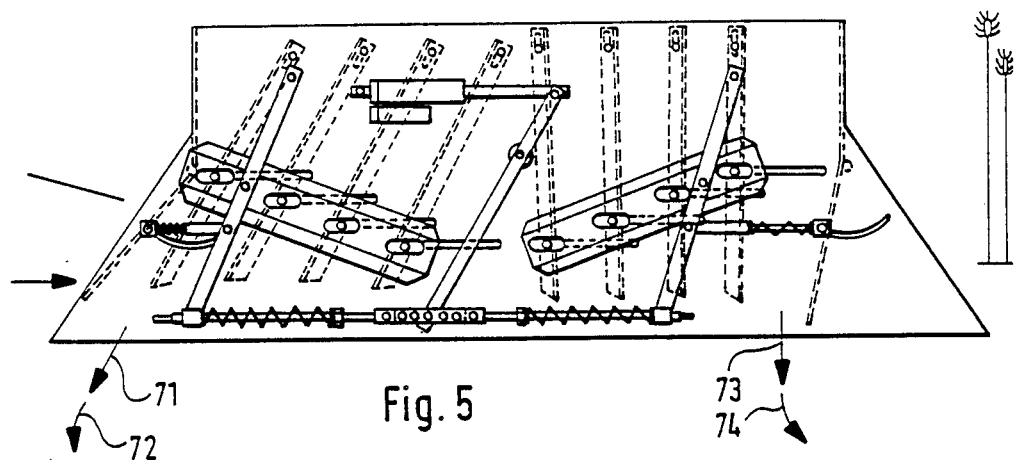
FIG. 5 shows the distributing device of FIG. 4 in a position swung to the left, in a chopping operation in a field on a slope to the left, or wind action from the left.

FIG. 5 shows the chopper operating on a slope on the left side, or with wind action from the left. On the left side, the chopped straw exits from the distributing device in the direction of the arrow 71, thus with a component in the cross direction outwardly. Due to the wind action, a direction of motion is subsequently produced in the direction of the arrow 72. On the right side, the chopped straw exits from the distributing device in the direction of the arrow 73, thus without a component in the cross direction. The direction according to arrow 74 is produced due to the wind action, or influence of the sloped position. Thus the chopped straw (chaff) is caused to slightly move outwardly.

Figure 6:
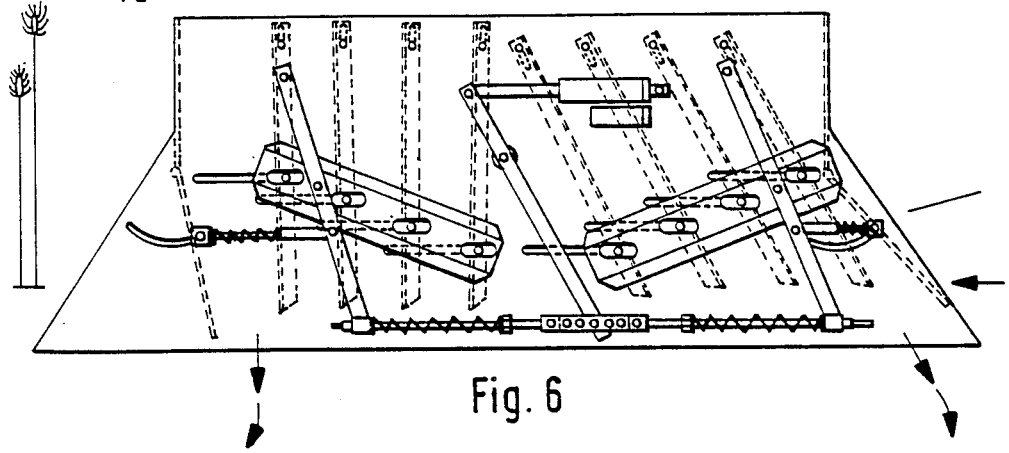
FIG. 6 shows the device of FIG. 4 operating on a slope to the right, or with wind action from the right.

FIG. 6 shows, in a representation corresponding with FIG. 5, the chopping operation on the slope to the right or with wind action from the right.

With the possibility of adjusting the coupling rod 13, 14 as shown in FIGS. 2 and 3, the adjustment is effected with the spindle motor 8, or the hydraulic cylinder 8. When the spindle motor 8 is actuated to the right, the swing lever 9 is, for the transmission of force, pivoted clockwise around the rotary point 11. For this purpose, the spindle motor 8 has to be pivotable around the swivel point 26. The rearward end of the swing lever 9 with the bolt 12 is, correspondingly, moved to the left, causing the coupling rod 13, 14 to be shifted to the left, too.

Figure 7:
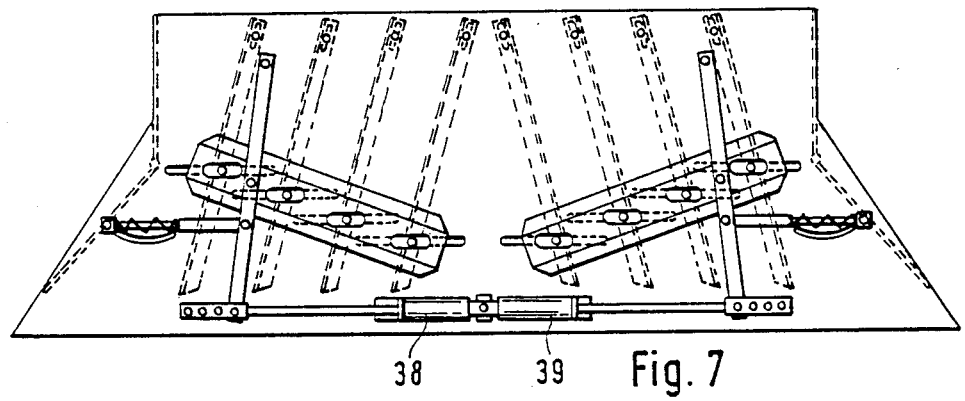
FIG. 7 shows a distributing device with two double-action hydraulic cylinders acting between the set levers.

FIG. 7 shows another possibility for driving the coupling rod, which is comprised of two double-action cylinders 38, 39. The ends of the coupling rod have rows of holes, permitting changing the effective length of the coupling rod.

Figure 8:
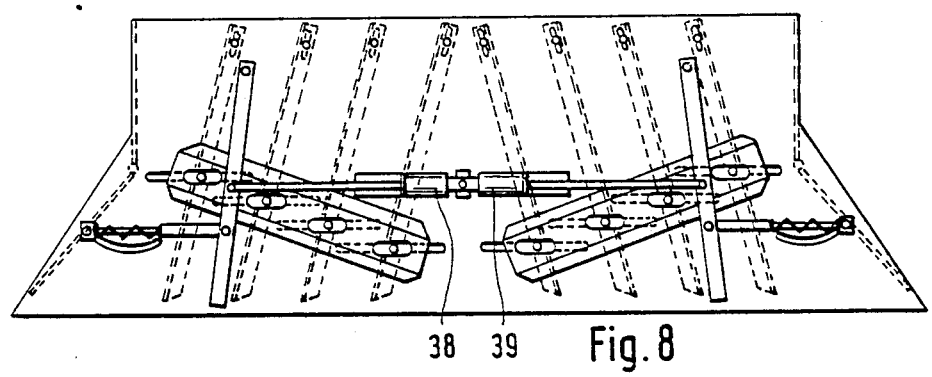
FIG. 8 shows the device of FIG. 7, with the hydraulic cylinders directly acting on the set bars.

FIG. 8 shows a distributing device in which the double-action cylinders 38, 39 drive the coupling rods. In the present case, the set bars 17, 18 are directly engaged by the piston rods of the hydraulic cylinders 38, 39.

Figure 9:
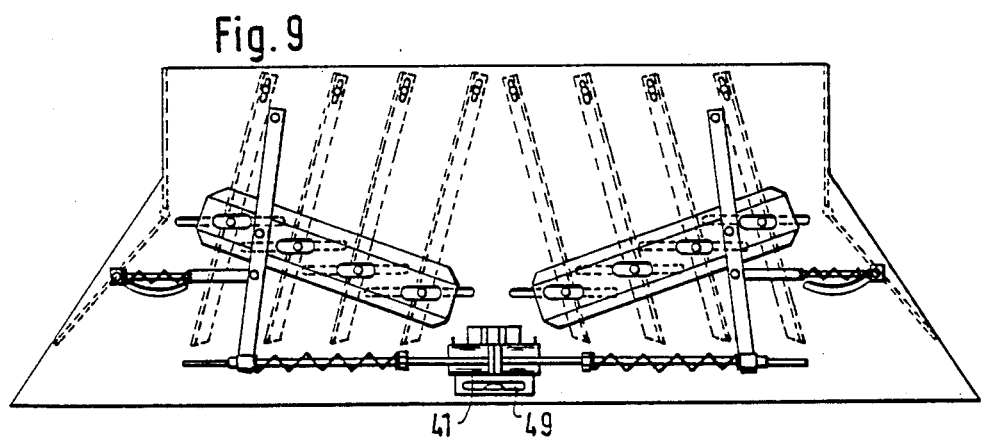
FIG. 9 shows a distributing device with a coupling rod driven by a double-action operating cylinder with through-extending piston rod.

In the representation according to FIG. 9, the drive for the coupling rod is comprised of a double-action operating cylinder 41 with a through-extending piston rod. A component having an oblong hole 49 is connected with the operating cylinder 41. The operating cylinder 41 can be adjusted relative to the coupling rods and locked through the oblong hole 49 so as to permit changing the "zero point" of the operating cylinder 41.

FIG. 10 shows a coupling rod with two gas springs 35, which are connected with each other by means of the connection element 34.

In FIG. 11, the spiral springs 32, 33 are used instead of the gas pressure springs. The spiral springs are capable of sliding on the tubes 131 and 132, respectively, and of being compressed by the pressure elements 133 and 134 sliding on said tubes. The inward movement of a pressure element is limited by the blocking of the associated spring.

FIG. 12 shows a coupling rod with a left pressure spring (spiral spring) 32 and a right pressure spring (spiral spring) 33. The force admitted by the swing lever 9 for the transmission of force is applied via the bolt 12. The rows of holes in the connection elements 42 and 43 are shown within the vicinity of the bolt 12. The connection elements 42, 43 are rigidly connected with the coupling rod 13, 14. The counter nuts 48, which fix the nuts 40 forming the stop means, are disposed in the inner and outer zone of the coupling rod 13, 14. Thus the stop means formed by the nuts 40 are adjustable. The springs 32 and 33 are disposed between the stops 40 and the force-transmitting pieces 23. The latter are displaceably guided on the coupling rod 13, 14. The springs 32, 33 tend to force the force-transmitting pieces outwardly against the outer stops 40 The outer stops 40, too, are formed by nuts that can be fixed by the counter nuts 48. The outer stops 40, therefore, are adjustable as well. The coupling rod 13, 14 is surrounded on both sides by the tubes 36, 37, which, at their inner ends, rest against the inner stops 40, or which may be welded, and their outer ends form stops for the force-transmitting pieces 23. Thus the path of displacement of the force-transmitting pieces 23 is limited outwardly by the outer stops 40, and inwardly by the outer ends of the tubes 36, 37. The bolts 44 serve for the movable connection with the set levers 15, 16.

The mode of operation of the coupling rod 13, 14 shown in FIG. 12 is shown best in connection with FIGS. 2 to 6, with the representation in FIG. 11 corresponding with the representation in FIGS. 2 to 6. When the coupling rod 13, 14 is shifted to the right, the left force-transmitting piece 23 and thus the rearward end of the set lever 16 are carried along by the outer stop 40. The left spring 32 remains in the non-compressed condition. The right force-transmitting piece 23 remains idle or it moves to the right to the extent permitted by the oblong holes 21 by prior adjustment. The right spring 33 is compressed in this process. In the representation according to FIG. 12, the right force-transmitting piece 23 has not yet fully reached the stop formed by the right, outer end of the tube 36.

FIG. 3 shows that the right set lever 15 is swung to a greater extent than the left set lever 16, which is effected by the cooperation between the limited displacement of the force-transmitting pieces 23 and the springs 32, 33.

It is possible also to omit the springs 32, 33 with the coupling rod 13, 14 shown in FIG. 12, in which case, however, the movement of the force-transmitting pieces 23 and thus of the set levers 15, 16 will be unstable and not effected forcibly.

Figure 13:
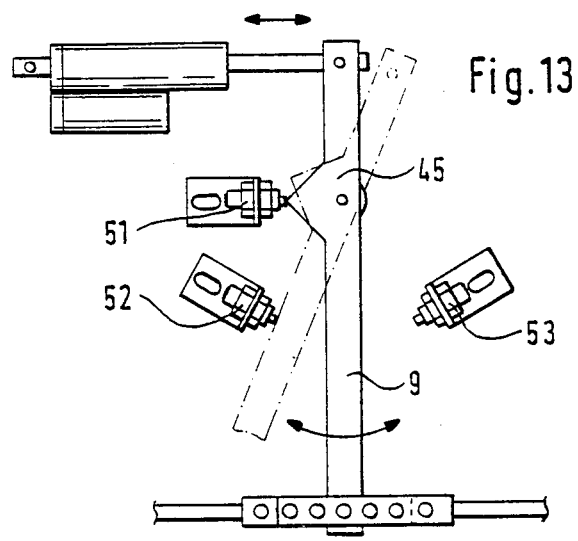
FIG. 13 shows a drive for the coupling rod with switches for various positions of the coupling rod.

FIG. 13 shows the switches 51, 52, 53 showing different positions of the swing lever 9 driving the coupling rod. The switch 52 is actuated after the swing lever 9 has reached a position corresponding with the left final position of the coupling rod. Accordingly, the switch 53 indicates the right final position of the coupling rod. The center position of the coupling rod may be indicated by the switch 51. For this purpose, the swing lever 9 is fitted with a switching cam 45 of which the tip is disposed in the center position of the swing lever 9 in the line connecting the swing axis 11 of the swing lever 9 with the switch 51.

Figure 14:
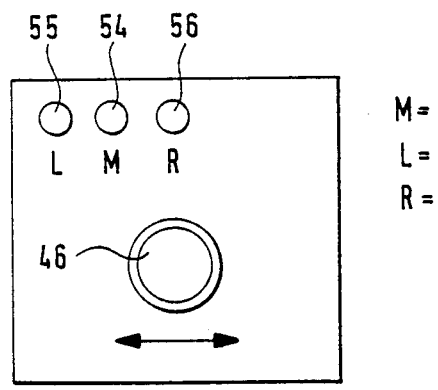
FIG. 14 is an instrument for reading the various positions of the coupling rod.

FIG. 14 shows an indicating device in which the lamp 54 is associated with the switch 51, the lamp 55 with the switch 52, and the lamp 56 with the switch 53. The center, left final and right final positions can thus be indicated correspondingly.

The invention makes it possible to adapt the spreading pattern from the operator's seat to the grain cutting width of the harvester when mowing and threshing on a slope or with wind blowing, and permits to alternately adjust the opposite set of baffle-like flaps to a greater or lesser extent.

FIG. 19 shows a force-transmitting piece 23, on which a protective sleeve 201 gripping over the coupling rod 13 is fastened. The protective sleeve 201 grips over the spring 32, too, which in turn grips over both the coupling rod 13 and the tube 37.

FIG. 20 shows, in a representation corresponding with FIG. 19, an additional protective sleeve 202, which, in the way of a telescope, grips under the protective sleeve 201. Said additional protective sleeve 202 is fastened on the stop 40 by welding.

Figure 21:
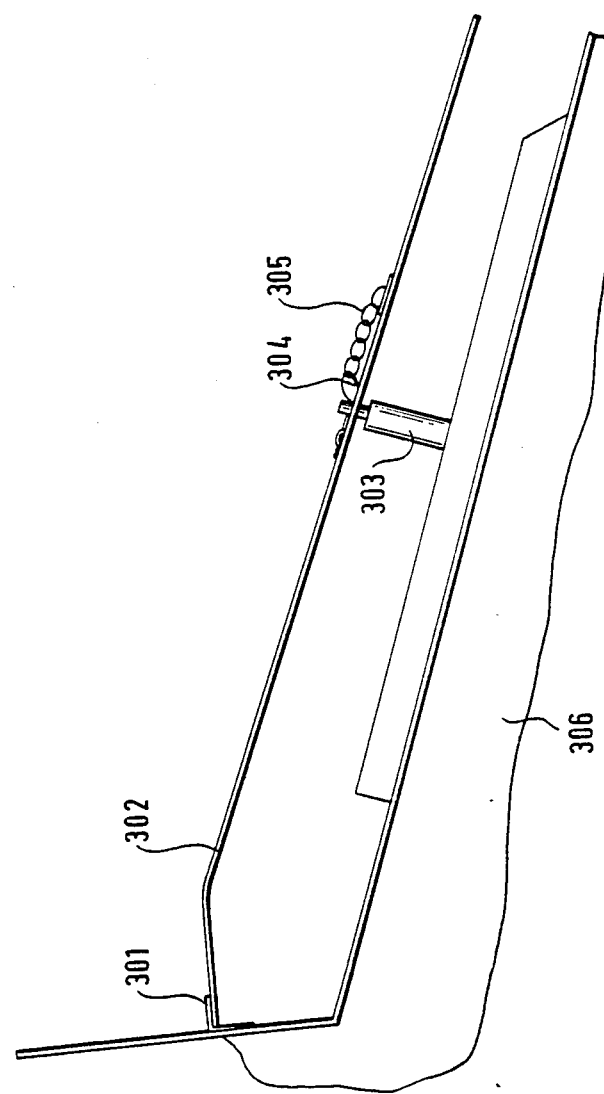
FIG. 21 is a lateral view showing a flexible plate for covering the distributing device.

FIG. 21 shows a flexible plate 302 extending across the width of the distributing device. The plate is fastened on the angle irons 301, for example by means of screws. Furthermore, the plate 302 is disposed with a spacing from the distributor box 306. Such spacing is obtained by means of the support bolts 303, on which the plate 302 is fastened by means of the safety pawls 304. The chains 305 serve for fastening splints on the top end of the support bolts.

What is claimed is:

1. Distributing device for a chaff chopper for a mowing-and-threshing machine having a top cover plate or casing, beneath which a right and a left group of baffles are arranged next to one another at an angle, said baffles, at their ends facing the chopper, being spaced from and supported for swinging around axles being rigidly connected with guide bolts to the cover plate or casing, said guide bolts penetrating guide slots in the cover plate or in the casing; and a set bar associated with each of the two groups of baffles;

whereby the baffles are rotatably connected with the guide bolts in fixed bearings by the set bars and, at their ends facing the chopper, rotatably and displaceably arranged on the cover plate, or casing in the axles;

whereby the guide slots of each group extend in a transverse direction and are substantially parallel with one another and with a line drawn through each of the axles;

whereby the set bars of each group are arranged with an outward inclination relative to the line through each of said axles in a way such that the spacing of the guide bolts from the axles is reduced from one baffle to the next baffle in correspondence with the outward displacement of the guide slots;

whereby a set lever is connected articulatedly to each set bar, each said lever being articulated on said cover plate in each case or casing at a point spaced from the point of articulation thereof on said set bar; and whereby a coupling rod connects each said set lever with another set lever of like configuration; characterized in that the set levers are connected with the coupling rods which are connected to each other and slideable lengthwise, and the lengthwise movement of said coupling rods is limited by inner and outer stops.

2. Distributing device as defined in claim 1 characterized in that the outer stops are adjustable.

3. Distributing device as defined in claim 1 characterized in that the inner stops are adjustable.

4. Distributing device as defined in claim 1, characterized in that the inner stops are formed by the ends of the tubes.

5. Distributing device as defined in claim 1, characterized in that it includes pressure springs located between the points of connection of the set levers with the coupling rods, and the inner stops on the coupling rods.

6. Distributing device as defined in claim 1, characterized in that the inner stops are block-supported pressure springs.

7. Distributing device as defined in claim 1, characterized in that the coupling rods consist of two piston-cylinder units provided with gas operated springs.

8. Distributing device as defined in claim 1, characterized in that the length of the coupling rods is adjustable.

9. Distributing device as defined in claim 1, characterized in that the bearings of the guide bolts are displaceable and fixable on the set bars in oblong holes on said set bars.

10. Distributing device as defined in claim 9, characterized in that the oblong holes are arranged on the set bars relative to one another in a transverse direction, and extend substantially parallel with the lines drawn through the axles, around which the baffles swing.

11. Distributing device as defined in claim 1, characterized in that for fixing each set bar in the desired position of the baffles, a guide bolt is tightened in a guide slot of the cover plate or casing by a nut fitted with a hand lever.

12. Distributing device as defined in claim 1, characterized in that it includes force-transmitting pieces which are connected jointedly with each of the set levers, said pieces being displaceably guided on the coupling rods.

13. Distributing device as defined in claim 12, characterized in that a protective sleeve gripping across each of the coupling rods is fastened on each of the force-transmitting pieces.

14. Distributing device as defined in claim 13, characterized in that an additional protective sleeve gripping under each of the protective sleeves on each of the coupling rods and telescoping therewith is secured on each of the stops.

15. Distributing device as defined in claim 1, characterized in that it includes a flexible plate which is fastened on the distributing device across the width thereof.

16. Distributing device as defined in claim 1, characterized in that it includes two lateral limiting plates located on the cover plate or casing, each being connected jointedly with a baffle-like flap on the outlet side of said cover plate or casing, each said flap being connected jointedly with the set bar for the set lever by a two-part actuating bar; and in that the two parts of the actuating bar are displaceable against each other telescopically to a limited extent and each, in extended position, acted upon by a spring in a way such that the flap, with outward adjustment of the set lever, is forced outwardly into its outwardly swung position, and upon inward adjustment carried along inwardly in the last part of the path of swing of the set lever after the actuating bar has been completely extended.

17. Distributing device as defined in claim 1, characterized in that it includes switches for indicating the left final positions, the right final position or the center position of the coupling rods, or a swing lever driving said coupling rods, each individually or collectively.

* * * * *